US010720835B2

(12) United States Patent
King et al.

(10) Patent No.: US 10,720,835 B2
(45) Date of Patent: Jul. 21, 2020

(54) LIMITING AVERAGE CURRENT IN A PEAK-CONTROLLED BOOST CONVERTER

(71) Applicant: Cirrus Logic International Semiconductor Ltd., Edinburgh (GB)

(72) Inventors: Eric J. King, Austin, TX (US); Eric B. Smith, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/122,619

(22) Filed: Sep. 5, 2018

(65) Prior Publication Data

US 2019/0089245 A1 Mar. 21, 2019

Related U.S. Application Data

(60) Provisional application No. 62/559,800, filed on Sep. 18, 2017, provisional application No. 62/567,332, filed on Oct. 3, 2017.

(51) Int. Cl.
*H02M 3/156* (2006.01)
*H02M 3/157* (2006.01)
(Continued)

(52) U.S. Cl.
CPC ............. *H02M 3/156* (2013.01); *G05F 1/46* (2013.01); *H02H 9/02* (2013.01); *H02M 3/157* (2013.01);
(Continued)

(58) Field of Classification Search
CPC ....... H02M 3/155–158; H02M 3/1563; H02M 3/1584; H02M 3/1588; H02M 2001/0022; Y02B 70/1466; G05F 1/46; H02H 9/02
(Continued)

(56) References Cited

U.S. PATENT DOCUMENTS

| 4,929,882 A * | 5/1990 | Szepesi ................. H02M 3/156 323/222 |
| 6,222,356 B1 | 4/2001 | Taghizadeh-Kaschani |

(Continued)

FOREIGN PATENT DOCUMENTS

EP 2775599 A1 9/2014

OTHER PUBLICATIONS

International Search Report and Written Opinion of the International Searching Authority, International Application No. PCT/US2018/051284, dated Dec. 21, 2018.
(Continued)

*Primary Examiner* — Yemane Mehari
(74) *Attorney, Agent, or Firm* — Jackson Walker L.L.P.

(57) ABSTRACT

A method may include monitoring a current through a power inductor of a boost converter and detecting when a mathematical integral of a difference between the current as monitored and a desired average current for the power inductor is equal to zero. Another method may include in a first mode of operation of a boost converter, controlling switching behavior of switches of the boost converter to regulate an output voltage generated by the boost converter and in a second mode of operation of the boost converter, controlling switching behavior of switches of the boost converter to regulate an input current received by the boost converter. Another method may include monitoring a current through a power inductor of a boost converter and detecting when the current as monitored exceeds a maximum current for the power inductor.

20 Claims, 4 Drawing Sheets

(51) Int. Cl.
  *H02M 3/158* (2006.01)
  *G05F 1/46* (2006.01)
  *H02H 9/02* (2006.01)
  *H02M 1/00* (2006.01)

(52) U.S. Cl.
  CPC .... *H02M 3/158* (2013.01); *H02M 2001/0009* (2013.01)

(58) Field of Classification Search
  USPC ....... 323/224, 282, 285, 288, 299, 300, 301, 323/303
  See application file for complete search history.

(56) References Cited

U.S. PATENT DOCUMENTS

| | | | |
|---|---|---|---|
| 7,605,574 | B2 | 10/2009 | Dearn et al. |
| 7,615,981 | B2* | 11/2009 | Wong .................... H02M 3/156 323/282 |
| 8,686,767 | B1 | 4/2014 | Nene |
| 8,937,469 | B2* | 1/2015 | Clark ....................... G05F 1/70 323/207 |
| 9,712,055 | B1* | 7/2017 | Swartz .................. H02M 3/158 |
| 2006/0145675 | A1* | 7/2006 | Lee ....................... H02M 3/156 323/282 |
| 2006/0238174 | A1* | 10/2006 | Russell .............. H05B 33/0818 323/229 |
| 2009/0066301 | A1 | 3/2009 | Oswald et al. |
| 2011/0110132 | A1* | 5/2011 | Rausch ................ H02M 1/4225 363/124 |
| 2011/0204859 | A1 | 8/2011 | Prodic et al. |
| 2012/0275198 | A1* | 11/2012 | Cohen ............... H02M 3/33507 363/21.12 |
| 2014/0111170 | A1* | 4/2014 | Shi ...................... H02M 3/1588 323/271 |
| 2014/0239922 | A1 | 8/2014 | Nene |
| 2014/0239935 | A1 | 8/2014 | Nene |
| 2014/0247029 | A1 | 9/2014 | Krabbenborg |
| 2014/0313799 | A1 | 10/2014 | Hung et al. |
| 2015/0022172 | A1 | 1/2015 | Hari et al. |
| 2015/0146458 | A1* | 5/2015 | Lim .................... H02M 3/158 363/44 |
| 2016/0006336 | A1 | 1/2016 | Bennett et al. |
| 2019/0131871 | A1 | 5/2019 | Krabbenborg |
| 2019/0181754 | A1 | 6/2019 | Ash et al. |

OTHER PUBLICATIONS

International Search Report and Written Opinion of the International Searching Authority, International Application No. PCT/US2019/037483, dated Sep. 18, 2019.

* cited by examiner

LIMITING AVERAGE CURRENT IN A PEAK-CONTROLLED BOOST CONVERTER

RELATED APPLICATION

The present disclosure claims priority to U.S. Provisional Patent Application Ser. No. 62/567,332, filed Oct. 3, 2017, and U.S. Provisional Patent Application Ser. No. 62/559,800 filed Sep. 18, 2017, both of which are incorporated by reference herein in their entirety.

FIELD OF DISCLOSURE

The present disclosure relates in general to circuits for electronic devices, including without limitation personal audio devices such as wireless telephones and media players, and more specifically, to limited average current in a peak-controlled boost converter.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones or one or more speakers. Such circuitry often includes a speaker driver including a power amplifier for driving an audio output signal to headphones or speakers. Oftentimes, a power converter may be used to provide a supply voltage to a power amplifier in order to amplify a signal driven to speakers, headphones, or other transducers. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier.

Often, boost converters operate as peak current-controlled boost converters, wherein a main control loop of a control system is used to determine a peak current requirement on each switching phase of the boost converter in order to generate a desired boosted output voltage of the boost converter. For boost duty cycles where a duty cycle (e.g., which may be determined by subtracting an arithmetic ratio from the number one, wherein the arithmetic ratio equals the input voltage supplied to the boost converter divided by the boost output voltage of the boost converter), slope compensation circuitry may be required to avoid sub-harmonic behavior of the boost converter. Also present in many boost converter control systems is protection circuitry to ensure that the current of a boost converter is maintained below a maximum value. The detection of the peak current in accordance with the main control loop and detection of the maximum allowable current is often performed by two separate circuits: a first comparator comparing a measured current (e.g., measured current of a power inductor of the boost converter) with a slope-compensated target peak current signal and a second comparator comparing the measured current to the maximum current limit. The main control loop, which may also be known as a compensator, may generate a target peak current signal which may be modified by slope compensation circuitry, and such slope-compensated target peak current signal may be compared by the first comparator to the measured current in order to perform peak-current control of a boost converter. However, because slope compensation may occur in analog circuitry, an unknown amount of correction may exist at the point the first comparator toggles. Such error may be removed by the main control loop in regulating the boosted voltage output by the power converter.

However, the presence of this unknown error may result in the inability to directly control the maximum current during any specific switching cycle of the boost converter. This is because the second comparator allows for a measurement without slope compensation of the inductor current above a threshold. If the second comparator is used to control the current in the inductor directly, the lack of slope compensation on this measurement may result in sub-harmonic behavior. To avoid such sub-harmonic behavior while limiting the current as detected by the second comparator, the output of the second comparator may be fed back to allow control circuitry to apply desired limit behavior to the slope-compensated target peak current signal. For example, an additional control loop may be present such that when operating under the current-limited condition, the slope-compensated target peak current signal is modified to obtain the desired limited current behavior.

As a result, a control system may be created that results in limiting and controlling the peak current of a power inductor of a boost converter below a maximum threshold. However, in many systems, an error between the peak inductor current and the average inductor current can be quite large and inductor variation can lead to significant challenges in determining a proper peak current limitation.

SUMMARY

In accordance with the teachings of the present disclosure, one or more disadvantages and problems associated with existing approaches to operating a power converter may be reduced or eliminated.

In accordance with embodiments of the present disclosure, a method may include monitoring a current through a power inductor of a boost converter and detecting when a mathematical integral of a difference between the current as monitored and a desired average current for the power inductor is equal to zero.

In accordance with these and other embodiments of the present disclosure, a method may include in a first mode of operation of a boost converter, controlling switching behavior of switches of the boost converter to regulate an output voltage generated by the boost converter and in a second mode of operation of the boost converter, controlling switching behavior of switches of the boost converter to regulate an input current received by the boost converter.

In accordance with these and other embodiments of the present disclosure, a method may include monitoring a current through a power inductor of a boost converter and detecting when the current as monitored exceeds a maximum current for the power inductor.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
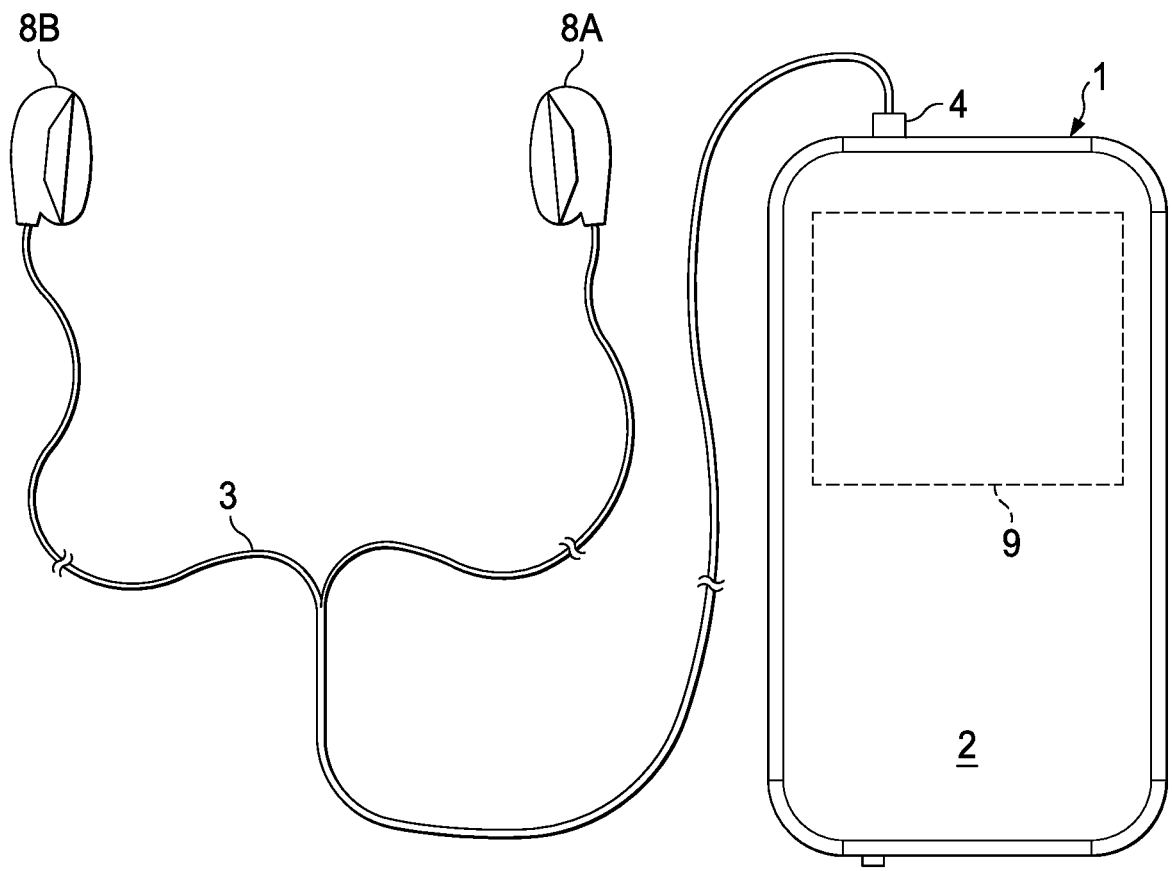
FIG. 1 illustrates an example personal audio device, in accordance with embodiments of the present disclosure.

FIG. 1 illustrates an example personal audio device 1, in accordance with embodiments of the present disclosure. FIG. 1 depicts personal audio device 1 coupled to a headset 3 in the form of a pair of earbud speakers 8A and 8B. Headset 3 depicted in FIG. 1 is merely an example, and it is understood that personal audio device 1 may be used in connection with a variety of audio transducers, including without limitation, headphones, earbuds, in-ear earphones, and external speakers. A plug 4 may provide for connection of headset 3 to an electrical terminal of personal audio device 1. Personal audio device 1 may provide a display to a user and receive user input using a touch screen 2, or alternatively, a standard liquid crystal display (LCD) may be combined with various buttons, sliders, and/or dials disposed on the face and/or sides of personal audio device 1. As also shown in FIG. 1, personal audio device 1 may include an audio integrated circuit (IC) 9 for generating an analog audio signal for transmission to headset 3 and/or another audio transducer.

Figure 2:
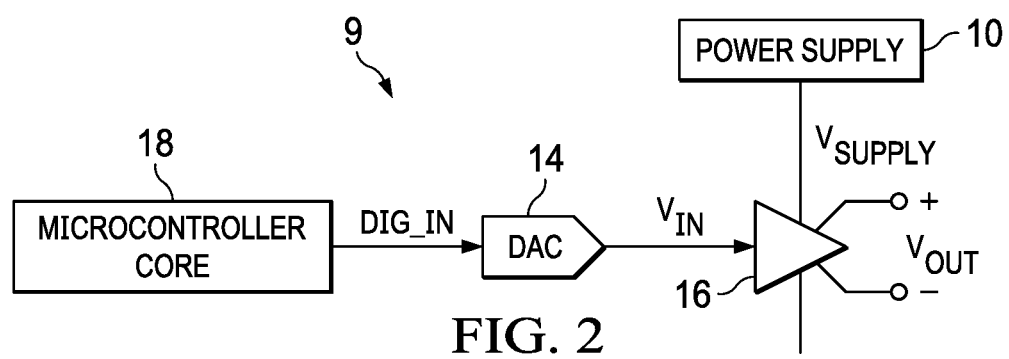
FIG. 2 illustrates a block diagram of selected components of an example audio integrated circuit of a personal audio device, in accordance with embodiments of the present disclosure.

FIG. 2 illustrates a block diagram of selected components of an example audio IC 9 of a personal audio device, in accordance with embodiments of the present disclosure. As shown in FIG. 2, a microcontroller core 18 may supply a digital audio input signal DIG_IN to a digital-to-analog converter (DAC) 14, which may convert the digital audio input signal to an analog signal $V_{IN}$. DAC 14 may supply analog signal $V_{IN}$ to an amplifier 16 which may amplify or attenuate audio input signal $V_{IN}$ to provide a differential audio output signal $V_{OUT}$, which may operate a speaker, a headphone transducer, a line level signal output, and/or other suitable output. In some embodiments, DAC 14 may be an integral component of amplifier 16. A power supply 10 may provide the power supply rail inputs of amplifier 16. In some embodiments, power supply 10 may comprise a switched-mode power converter, as described in greater detail below. Although FIGS. 1 and 2 contemplate that audio IC 9 resides in a personal audio device, systems and methods described herein may also be applied to electrical and electronic systems and devices other than a personal audio device, including audio systems for use in a computing device larger than a personal audio device, an automobile, a building, or other structure.

Figure 3:
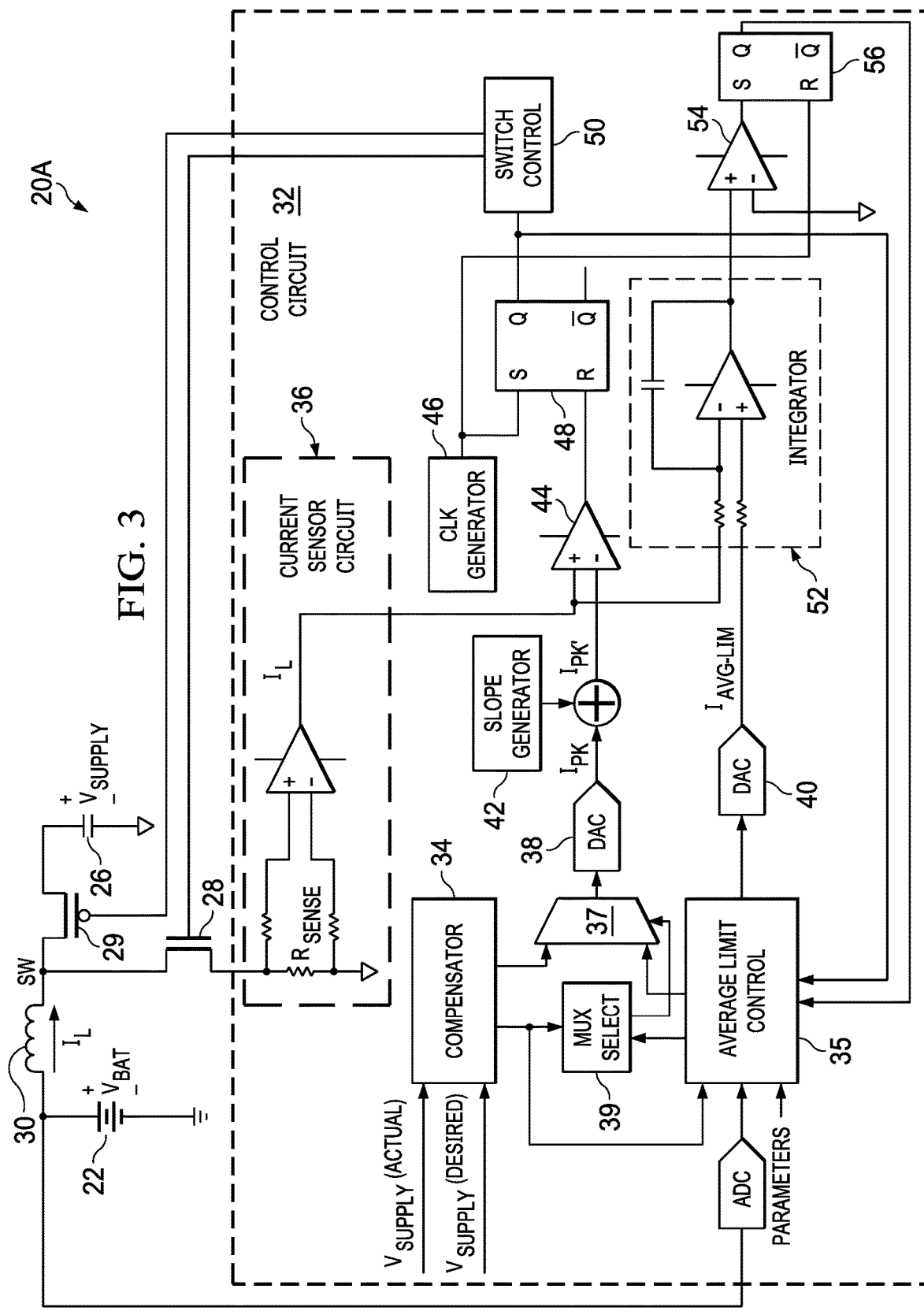
FIG. 3 illustrates a block diagram of selected components of an example peak-current control boost converter with average current limit control which may be used to implement the power supply shown in FIG. 2, in accordance with embodiments of the present disclosure.
Figure 4:
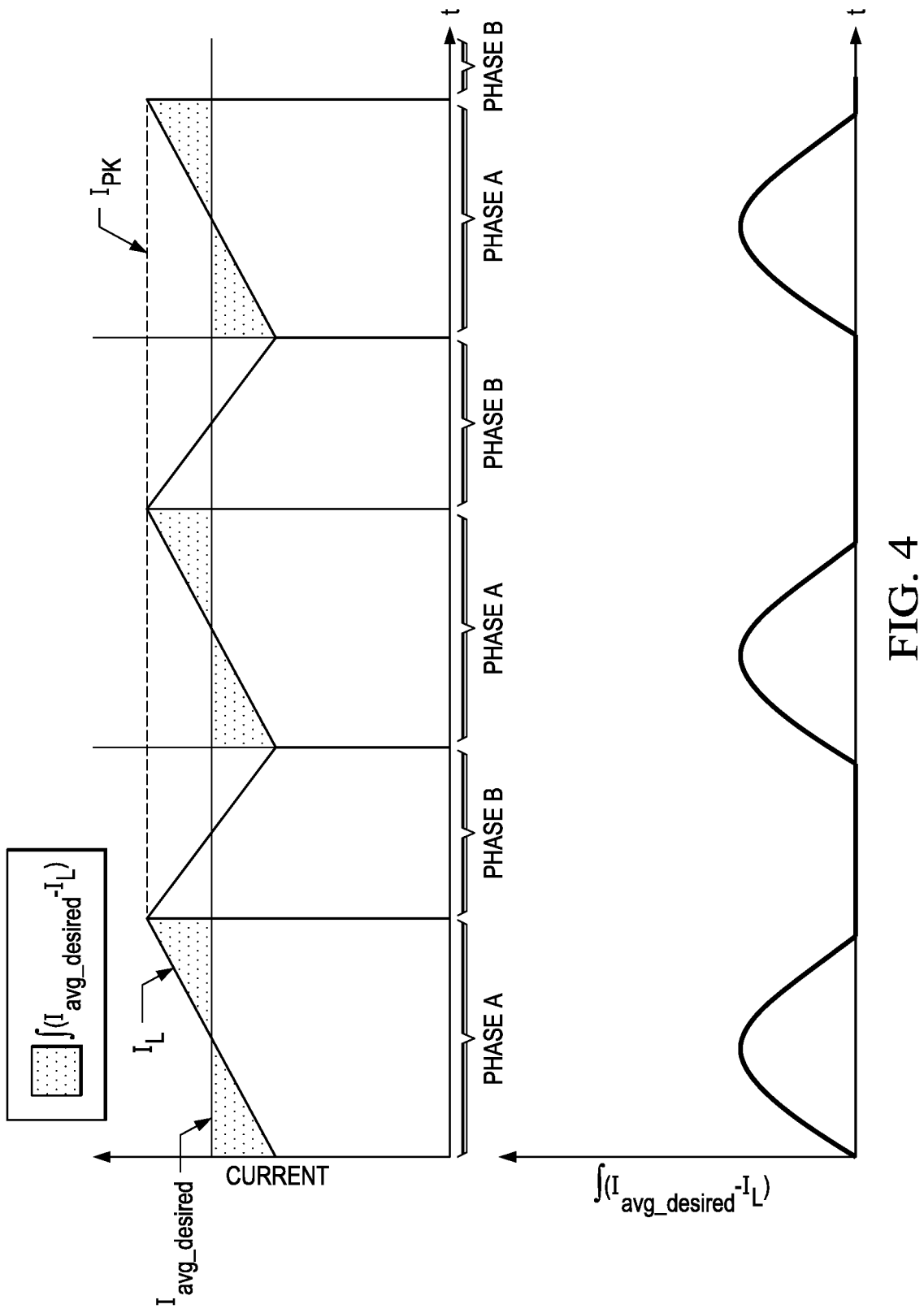
FIG. 4 illustrates graphs depicting example waveforms for actual inductor current and target average inductor current versus time and for a mathematical integral of a difference of the quantity of the target average inductor current and the actual inductor current target, in accordance with embodiments of the present disclosure.

FIG. 3 illustrates a block diagram of selected components of an example peak-current control boost converter 20A with average current limit control which may be used to implement power supply 10 shown in FIG. 2, in accordance with embodiments of the present disclosure. As shown in FIG. 3, boost converter 20A may include a battery 22, a power inductor 30, a switch 28 implemented as an n-type metal-oxide-semiconductor field-effect transistor (NFET), a switch 29 implemented as a p-type metal-oxide-semiconductor field-effect transistor (PFET), and a control circuit 32. FIG. 4 illustrates graphs depicting example waveforms for actual inductor current $I_L$ and target average inductor current $I_{AVG\_LIM}$ versus time and for a mathematical integral of a difference of the quantity of target average inductor current $I_{AVG\_LIM}$ and actual inductor current $I_L$, in accordance with embodiments of the present disclosure.

In a first phase (labeled as "Phase A" in FIG. 4) of a switching cycle of boost converter 20A, control circuit 32 may cause switch 28 to be activated (e.g., closed, turned on, enabled) and switch 29 to be deactivated (e.g., opened, turned off, disabled). Thus, during the first phase, a switch node (labeled as "SW" in FIG. 3) may be effectively shorted to a ground potential, such that battery 22 applies its voltage $V_{BAT}$ across terminals of power inductor 30. As a result, an inductor current $I_L$ flowing in power inductor 30 may increase during the first phase. As described in greater detail below, control circuit 32 may cause inductor current $I_L$ to increase until such point that inductor current $I_L$ reaches a slope-compensated peak current limit $I_{PK}$, at which the first phase may end.

In a second phase (labeled as "Phase B" in FIG. 4) of the switching cycle of boost converter, control circuit 32 may cause switch 28 to be deactivated and switch 29 to be activated. As a result, inductor current $I_L$ may decrease during the second phase as power inductor 30 discharges into boost capacitor 26, boosting the supply voltage $V_{SUPPLY}$ to a voltage higher than battery voltage $V_{BAT}$. In continuous conduction mode (CCM), the second phase (Phase B) may continue until the end of the switching cycle, after which the first phase (Phase A) again occurs, as shown in FIG. 4. In discontinuous conduction mode (DCM), the second phase (Phase B) may continue until inductor current $I_L$ reaches zero, at which point a third phase (not shown in FIG. 4) of the switching cycle may begin. In the third phase, if it exists, control circuit 32 may cause both of switches 28 and 29 to be deactivated, and inductor current $I_L$ may remain at zero until the beginning of the next switching cycle, in which the first phase (Phase A) again occurs. In some embodiments, control circuit 32 may deactivate switch 29 during the second phase (Phase B), such that a body diode of the PFET implementing switch 29 conducts inductor current $I_L$ until it reaches zero.

As shown in FIG. 3, control circuit 32 may include a compensator 34, current average limit control block 35, a multiplexer 37, a current sensor circuit 36, a digital-to-analog converter (DAC) 38, a DAC 40, a slope generator 42, a peak current comparator 44, a clock (CLK) generator 46, a latch 48, switch block control 50, integrator 52, integrator comparator 54, and latch 56.

In operation in both CCM and DCM, the duty cycle of switch 28 (e.g., the duration of the first phase (Phase A)) may determine the magnitude of supply voltage $V_{SUPPLY}$ relative to battery voltage $V_{BAT}$. For example, in CCM, the duty cycle D needed to provide a desired supply voltage $V_{SUPPLY}$ may be given by $D=1-V_{BAT}/V_{SUPPLY}$. Thus, for a desired level of supply voltage $V_{SUPPLY}$ (e.g., which may be based on an envelope of an output signal of an amplifier), control circuit 32 may implement a feedback control loop, which may be internal to compensator 34, based on measured supply voltage $V_{SUPPLY}$ and measured inductor current $I_L$, which may be measured by current sensor circuit 36 (e.g., using a sense resistor with resistance $R_{SENSE}$; in some embodiments, $R_{SENSE}$ may have a resistance of approximately 10 mΩ). Thus, control circuit 32 may monitor actual supply voltage $V_{SUPPLY}$, compare it against a desired supply voltage $V_{SUPPLY}$, and increase or decrease actual supply voltage $V_{SUPPLY}$ by increasing or decreasing the peak of inductor current $I_L$. In that vein, compensator 34 may generate a digital signal indicative of a desired peak current, and DAC 38 may, when multiplexer 37 is selected to output the output of compensator 34, convert such digital signal into an analog equivalent peak current signal $I_{PK}$. Slope generator 42 may generate a slope compensation signal. In some embodiments, slope generator 42 may generate the slope compensation signal as a triangle or sawtooth waveform. The slope compensation signal may be combined with peak current signal $I_{PK}$ to generate slope-compensated peak current signal $I_{PK}$. Peak current comparator 44 may, during the first phase (Phase A), compare a measured inductor current $I_L$ (e.g., measured by a current sensor circuit 36), generating a control signal responsive to the comparison. Together, the output of comparator 44, clock generator 46, and latch 48 may be arranged as shown, or arranged in another suitable manner, to generate a control signal to switch control block 50. For example, clock generator 46 may generate a clock signal indicating the beginning of a switching cycle (e.g., beginning of the first phase/Phase A) and comparator 44 may, based on a point in which measured inductor current $I_L$ reaches peak current $I_{PK}$, generate a signal indicating the end of the first phase (Phase A). Based on such signals indicating timing of switch cycles and switch phases of boost converter 20A, latch 48 may generate appropriate control signal(s) to switch control block 50, which may in turn generate appropriate control signals to switches 28 and 29 to accordingly selectively activate and deactivate switches 28 and 29.

In addition, current average limit control block 35 may generate a digital signal indicative of a target average current limit, which DAC 40 may convert into an equivalent analog target average current signal $I_{AVG\_LIM}$ representative of a maximum average current to flow through power inductor 30. Such target average current signal $I_{AVG\_LIM}$ may be set based on a maximum current limit of power inductor 30, which may be among the parameters received by average limit control block 35. Other parameters received by average limit control block may include battery voltage $V_{BAT}$ and/or a parameter programmed to be indicative of maximum current as a function of battery voltage $V_{BAT}$. Additional or alternative parameters may include supply voltage $V_{SUPPLY}$, digital audio input signal DIG_IN, and/or analog signal $V_{IN}$.

Average limit control block 35 may also generate its own version of peak current $I_{PK}$ (which may be different than that generated by compensator 34) based on target average current signal $I_{AVG\_LIM}$ such that inductor current $I_L$ does not exceed the maximum current limit based on a control loop including integrator 52, integrator comparator 54, and latch 56. As shown in FIG. 3, a multiplexer 37 may select one of the peak current signals generator by compensator 34 and average limit control block 35 based on a control signal communicated from multiplexer select block 39.

Multiplexer select block 39 may be configured such that, if the peak current determined by compensator 34 is less than the peak current determined by average limit control block 35, then multiplexer select block 39 may cause multiplexer 37 to select the peak current determined by compensator 34. On the other hand, if the peak current determined by compensator 34 is greater than the peak current determined by average limit control block 35, then multiplexer select block 39 may cause multiplexer 37 to select the peak current determined by average limit control block 35.

In some embodiments, the maximum current limit of power inductor 30 may be determined by analyzing timing information of the output of latch 48 and the output of latch 56. Because the output of compensator 34 may have a slope compensation value added to it, the actual value of the peak current of inductor current $I_L$ may be different than that represented by the output of compensator 34. As such, when the current limiting behavior is applied (e.g., by multiplexer select block 39 causing multiplexer 37 to select the peak current determined by average limit control block 35), the value of compensator 34 at that point in time may be registered by average limit control block 35 and used as a reference to determine if compensator 34 has decreased its value below that of the controlled limited current as represented by target average current signal $I_{AVG\_LIM}$.

Accordingly, average limit control block 35 may operate to maintain the inductor current $I_L$ as measured over multiple switching cycles of boost converter 20A to operate at the average current limit as set by average limit control block 35 on the input to DAC 40. Accordingly, boost converter 20A may increase the value for peak current delivered to the input of DAC 38 until the average of inductor current $I_L$ is larger than the value for peak current delivered to the input of DAC 40. Once this occurs, average limit control block 35 may operate to decrease the value for peak current delivered to the input of DAC 38 until the average of inductor current $I_L$ is smaller than that of the value for peak current delivered to the input of DAC 40. Such operation may over time maintain the average inductor current at the current $I_{AVG\_LIM}$ value as represented by the output of DAC 40.

To further illustrate, consider the waveforms for measured current $I_L$ and target average current signal $I_{AVG\_LIM}$ shown in FIG. 4. Because boost converter 20A must operate with volt-second balancing, the average current during the second phase in CCM (Phase B) must be equal to average current during the first phase (Phase A) when in steady state. A simple analysis may show that during the first phase (Phase A), if the average current of power inductor 30 is equal to a desired average current $I_{avg\_desired}$, the mathematical integral of the actual inductor current $I_L$ during the first phase (Phase A) will be equal to the mathematical integral of the desired average current during the first phase. Therefore, if the first phase has a duration of time T1, it is known that:

$$\frac{\int_0^{T1} I_L}{T1} = \frac{\int_0^{T1} I_{avg\_desired}}{T1}$$

Thus:

$$\int_0^{T1} I_L = \int_0^{T1} I_{avg\_desired}$$

and $$\int_0^{T1} I_L - \int_0^{T1} I_{avg\_desired} = 0$$

Therefore:

$$\int_0^{T1} (I_L - I_{avg\_desired}) = 0$$

As the equations above show, if a difference between measured inductor current $I_L$ and desired average current $I_{avg\_desired}$ is integrated over the first phase (Phase A), the result of the integration will be zero (0). The equations above show that if the value over the T1 period is integrated, then the value will be zero. Likewise, if the difference is integrated, the T1 value can be found when the result of the integral is zero (0). FIG. 4 also shows the value of the integration of a difference between measured inductor current $I_L$ and the desired average current $I_{avg\_desired}$. The order of the subtraction is not critical as the critical detection point is when the integral is equal to zero.

To take advantage of the above analysis, integrator 52 may calculate a mathematical integral of the difference between actual inductor current $I_L$ and target average current signal $I_{AVG\_LIM}$, and integrator comparator 54 may compare the result to zero, such that latch 56 may generate an output indicative of when the integration performed by integrator 52 is zero. As a result of such output, digital compensation and current average limit control block 34 may appropriately modify target average current signal $I_{AVG\_LIM}$ and peak current $I_{PK}$ for subsequent switching cycles of boost converter 20A.

Accordingly, to alleviate the concerns with respect to inductor variation and to completely remove the errors associated in determining the average current while controlling the peak current, an integrator circuit may be provided prior to a current averaging comparator to allow for a determination of when the average input current of the boost converter crosses a threshold circuit. Blanking circuitry (not shown) may be provided to allow the current averaging comparator to not indicate that the threshold is crossed at the initiation of the first phase (Phase A), as the integrator may be set to zero at the beginning of the first phase.

Figure 5:
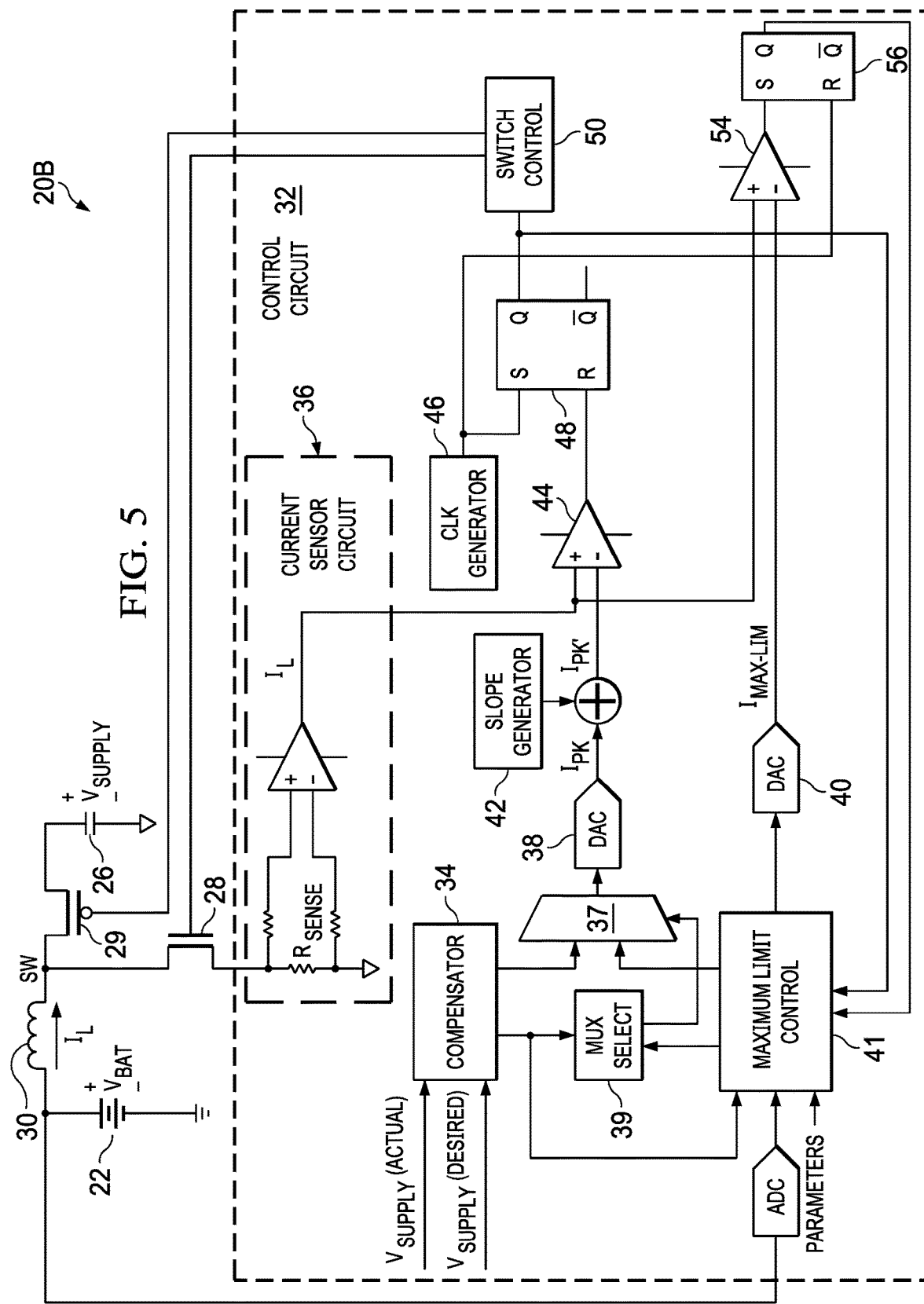
FIG. 5 illustrates a block diagram of selected components of an example peak-current control boost converter with maximum current limit control which may be used to implement the power supply shown in FIG. 2, in accordance with embodiments of the present disclosure.

FIG. 5 illustrates a block diagram of selected components of an example peak-current control boost converter 20B with maximum current limit control which may be used to implement power supply 10 shown in FIG. 2, in accordance with embodiments of the present disclosure. Boost converter 20B of FIG. 5 may be similar in many respects to boost converter 20A of FIG. 3. Accordingly, only the material differences between boost converter 20B and boost converter 20A are described below.

In particular, the main differences between boost converter 20B and boost converter 20A are that: (a) average limit control block 35 of boost converter 20A is replaced with maximum limit control block 41 in boost converter 20B, (b) integrator 52 of boost converter 20A is not present in boost converter 20B, (c) comparator 54 receives as its inputs measured inductor current $I_L$ and a maximum current $I_{MAX\_LIM}$ generated by maximum limit control block 41 and converted to the digital domain by DAC 40.

In operation, current maximum limit control block 41 may generate a digital signal indicative of a target maximum current limit, which DAC 40 may convert into an equivalent analog target maximum current signal $I_{MAX\_LIM}$ representative of a maximum instantaneous current to flow through power inductor 30. Such target maximum current signal may be set based on one or more the parameters received by maximum limit control block 41. Other parameters received by average limit control block may include battery voltage $V_{BAT}$ and/or a parameter programmed to be indicative of maximum current as a function of battery voltage $V_{BAT}$. Additional or alternative parameters may include supply voltage $V_{SUPPLY}$, digital audio input signal DIG_IN, and/or analog signal $V_{IN}$.

Maximum limit control block 41 may also generate its own version of peak current $I_{PK}$ (which may be different than that generated by compensator 34) based on target maximum current signal $I_{MAX\_LIM}$ such that inductor current $I_L$ does not exceed the maximum current limit based on a control loop including comparator 54, and latch 56. As shown in FIG. 5, a multiplexer 37 may select one of the peak current signals generator by compensator 34 and maximum limit control block 41 based on a control signal communicated from multiplexer select block 39.

Multiplexer select block 39 may be configured such that, if the peak current determined by compensator 34 is less than the peak current determined by maximum limit control block 41, then multiplexer select block 39 may cause multiplexer 37 to select the peak current determined by compensator 34. On the other hand, if the peak current determined by compensator 34 is greater than the peak current determined by maximum limit control block 41, then multiplexer select block 39 may cause multiplexer 37 to select the peak current determined by maximum limit control block 41.

In some embodiments, the maximum current limit of power inductor 30 may be determined by analyzing timing information of the output of latch 48 and the output of latch 56. Because the output of compensator 34 may have a slope compensation value added to it, the actual value of the peak current of inductor current $I_L$ may be different than that represented by the output of compensator 34. As such, when the current limiting behavior is applied (e.g., by multiplexer select block 39 causing multiplexer 37 to select the peak current determined by maximum limit control block 41), the value of compensator 34 at that point in time may be registered by maximum limit control block 41 and used as a reference to determine if compensator 34 has decreased its value below that of the controlled limited current as represented by target maximum current signal $I_{MAX\_LIM}$.

Accordingly, maximum limit control block 41 may operate to maintain inductor current $I_L$ as measured within boost converter 20B to operate below the maximum current limit as set by maximum limit control block 41 on the input to DAC 40. Accordingly, boost converter 20B may increase the value for peak current delivered to the input of DAC 38 until inductor current $I_L$ is larger than that of the value for peak current delivered to the input of DAC 40. Once this occurs, maximum limit control block 41 may operate to decrease the value for peak current delivered to the input of DAC 38 until inductor current $I_L$ is smaller than that of the value for peak current delivered to the input of DAC 40. Such operation may over time maintain the inductor current at or below the $I_{MAX\_LIM}$ value as represented by the output of DAC 40.

In accordance with the foregoing, the systems and methods disclosed herein may provide approaches for limiting average current in a peak-controlled boost converter by monitoring a current through a power inductor of a boost converter and detecting when a mathematical integral of a difference between the current as monitored and a desired average current for the power inductor is equal to zero. Further, the systems and methods disclosed herein provide for controlling switching behavior of switches of the boost converter based on the detection of when the mathematical integral of the difference is equal to zero. For instance, the switching behavior of the switches of the boost converter may be controlled based on a setting of a peak current for the power inductor and the boost converter may be controlled based on the detection of when the mathematical integral of the difference is equal to zero. The switching behavior of switches of the boost converter may be controlled to cause the boost converter to generate an actual boosted output voltage in accordance with a desired boosted output voltage. Further, a loop filter may be implemented to control the switching behavior of the switches of the boost converter to cause the boost converter to generate an actual boosted output voltage in accordance with a desired boosted output voltage.

Furthermore, the systems and methods disclosed herein may provide approaches for limiting average current in a peak-controlled boost converter by detecting during a switching period of a boost converter that a measured average current associated with the boost converter is equal to or greater than a desired average current and controlling switching behavior of switches of the boost converter based on the detection. The switching behavior of the switches of the boost converter may be controlled based on a setting of a peak current for the power inductor and the boost converter may be controlled based on the measured average current associated with the boost converter being equal to or greater than a desired average current. The switching behavior of switches of the boost converter may be controlled to cause the boost converter to generate an actual boosted output voltage in accordance with a desired boosted output voltage. Further, a loop filter may be implemented to control the switching behavior of the switches of the boost converter to cause the boost converter to generate an actual boosted output voltage in accordance with a desired boosted output voltage.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method, comprising:
   monitoring a current through a power inductor of a boost converter; and
   detecting when a mathematical integral of a difference between the current as monitored and a desired average current for the power inductor is equal to zero.

2. The method of claim 1, further comprising controlling switching behavior of switches of the boost converter based on the detection of when the mathematical integral of the difference is equal to zero.

3. The method of claim 2, wherein:
   the switching behavior of the switches of the boost converter are controlled based on a setting of a peak current for the power inductor; and
   the method further comprises controlling the boost converter based on the detection of when the mathematical integral of the difference is equal to zero.

4. The method of claim 2, further comprising controlling the switching behavior of the switches of the boost converter to cause the boost converter to limit the input current of the boost converter to the desired average current.

5. The method of claim 4, further comprising implementing a loop filter to control the switching behavior of the switches of the boost converter to cause the boost converter to limit the input current of the boost converter to the desired average current.

6. The method of claim 1, wherein monitoring the current through the power inductor comprises monitoring the current during a single phase of the boost converter switching cycle.

7. A method, comprising:
   in a first mode of operation of a boost converter, controlling switching behavior of switches of the boost converter to regulate an output voltage generated by the boost converter; and
   in a second mode of operation of the boost converter, controlling switching behavior of switches of the boost converter to regulate an input current received by the boost converter.

8. The method of claim 7, further comprising:
   detecting during a switching period of the boost converter that a measured current associated with the boost converter is equal to or greater than a desired current; and
   selecting between operation in the first mode and operation in the second mode based on the detection.

9. The method of claim 8, wherein the detecting comprises detecting during a switching period of the boost converter that a measured average current associated with the boost converter is equal to or greater than a desired average current.

10. The method of claim 8, wherein the detecting comprises detecting during a switching period of the boost converter that a measured maximum current associated with the boost converter is equal to or greater than a desired maximum current.

11. The method of claim 8, wherein the detecting comprises monitoring the measured current through the power inductor during a single phase of switching period.

12. The method of claim 7, wherein:
the switching behavior of the switches of the boost converter are controlled based on a setting of a peak current for the power inductor; and
the method further comprises controlling the boost converter based on the measured current associated with the boost converter being equal to or greater than a desired current.

13. The method of claim 7, further comprising controlling the switching behavior of the switches of the boost converter in the second mode of operation to cause the boost converter to limit the input current of the boost converter to a desired current.

14. The method of claim 13, further comprising implementing a loop filter to control the switching behavior of the switches of the boost converter to cause the boost converter to limit the input current of the boost converter to the desired current.

15. A method, comprising:
monitoring an average current through a power inductor of a boost converter; and
detecting when the average current as monitored exceeds a maximum current for the power inductor.

16. The method of claim 15, further comprising controlling switching behavior of switches of the boost converter based on the detection of when the average current as monitored exceeds the maximum current for the power inductor.

17. The method of claim 16, wherein:
the switching behavior of the switches of the boost converter are controlled based on a setting of a peak current for the power inductor; and
the method further comprises controlling the boost converter based on the detection of when the average current as monitored exceeds the maximum current for the power inductor.

18. The method of claim 16, further comprising controlling the switching behavior of the switches of the boost converter to cause the boost converter to limit the input current of the boost converter to the desired maximum current.

19. The method of claim 18, further comprising implementing a loop filter to control the switching behavior of the switches of the boost converter to cause the boost converter to limit the input current of the boost converter to the desired maximum current.

20. The method of claim 15, wherein monitoring the average current through the power inductor comprises monitoring the average current during a single phase of the boost converter switching cycle.

* * * * *